United States Patent [19]
Tateisi et al.

[11] 3,809,128

[45] May 7, 1974

[54] FLOATING AND SUBMERGING CONTROLLABLE HOSE

[75] Inventors: Tamotu Tateisi; Shigeo Ueda; Masayoshi Kuwabara, all of Yokohama, Japan

[73] Assignee: Bridgestone Tire Company Limited, Tokyo, Japan

[22] Filed: June 3, 1971

[21] Appl. No.: 149,622

Related U.S. Application Data
[63] Continuation of Ser. No. 887,921, Oct. 24, 1969, abandoned.

[52] U.S. Cl............... 138/114, 138/137, 138/148
[51] Int. Cl............................................. F16l 11/12
[58] Field of Search............ 138/114, 148, 113, 137

[56] References Cited
UNITED STATES PATENTS

| | | | |
|---|---|---|---|
| 3,670,772 | 6/1972 | Ziemek et al.................. | 138/148 X |
| 3,311,132 | 3/1967 | McWilliams........................ | 138/111 |
| 2,756,032 | 7/1956 | Dowell............................ | 138/114 X |

Primary Examiner—Jerry W. Myracle
Attorney, Agent, or Firm—Stevens, Davis, Miller & Mosher

[57] ABSTRACT

A submersible hose section having an inner hose and an outer hose, for transportation of liquid material, e.g., crude oil. The hose includes a resistive core structure secured to the outer surface of the inner hose for preventing the outer hose from coming into blocking contact with the inner hose when the space between the inner and outer hoses is evacuated for causing the hose section to submerge in sea water or other liquid medium.

5 Claims, 6 Drawing Figures

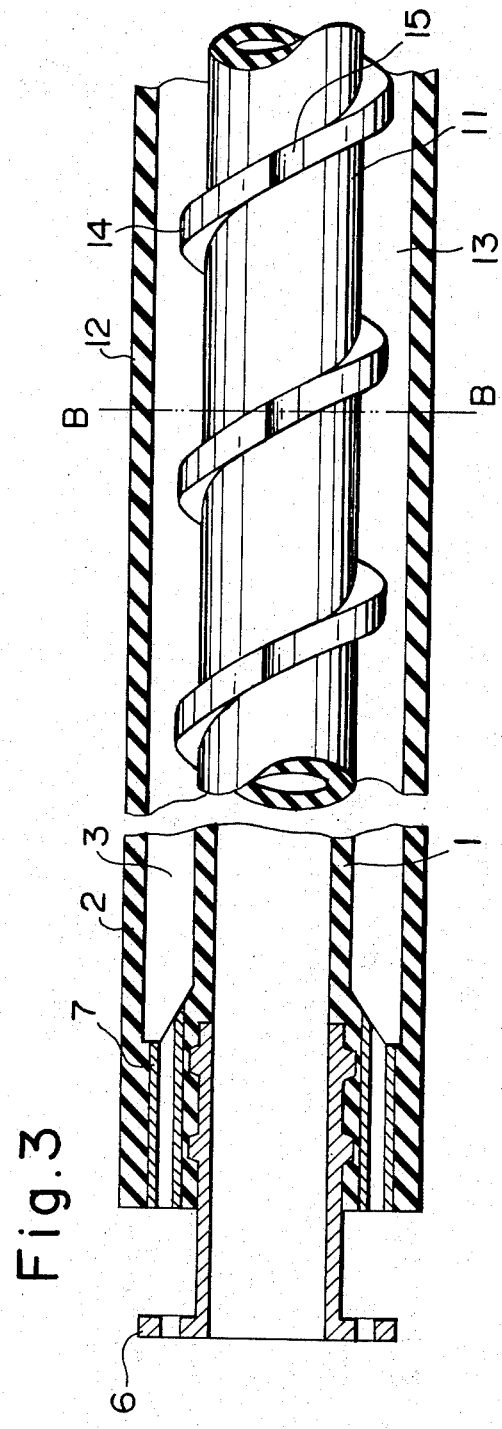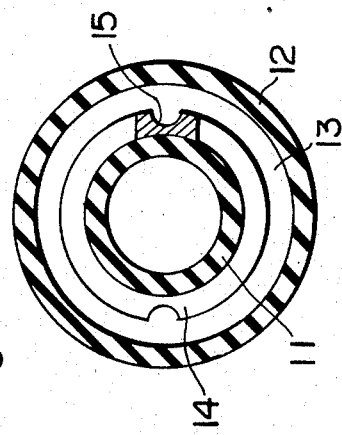

FLOATING AND SUBMERGING CONTROLLABLE HOSE

This application is a continuation of U. S. Pat. application Ser. No. 887,921, filed Dec. 24, 1969, now abandoned.

This invention relates to a submersible hose section, and more particularly to a submersible hose section for a hose line for transporting crude oil from a tanker moored offshore to land storage.

For transporting crude oil or other fluid material from an offshore tanker to a land storage, selectively submersible hoses are frequently used. For instance, U.S. Pat. No. 3,346,015, which is assinged to the same assignee as the present application, discloses a double-layered hose having an inner hose for transmitting the fluid and an outer hose disposed arround the inner hose with a controllable spacing therefrom. The volume of air in the spacing between the inner and outer hoses are regulated for selectively controlling the buoyancy acting on the hose section in the sea, in order to submerge the hose section in the sea water or float it on the sea surface.

Conventional submersible hoses of this type have the disadvantage that complete local closure of the air passage between the inner hose and the outer hose by water pressure or by suction may occur when evacuating the air from the air passage when it is desired to submerge the hose. This closure is mainly caused by the occurrence of excessive local deformation of the outer hose which blocks the evacuation path of air in the space between the inner and the outer hoses. It thus becomes difficult to achieve complete submersion of a hose line owing to this difficulty in control of submersion.

In view of the above disadvantage of the conventional submersible hoses, it is usual practice to provide an auxiliary air pipe of small diameter running along the whole length of a main submersible hose line consisting of a plurality of hose sections and to connect the small diameter air pipe to an evacuation duct provided at an end flange of each section of the hose line, so that each section of the submersible hose line can be evacuated independently.

However, this results in a hose line of relatively complicated construction which is frequently liable to damage. Moreover, assembly of the submersible hose line takes a considerable time and the external appearance of the hose is undesirably complicated so that a structure which offers considerable resistance to sea turbulence is obtained.

It is an object of the present invention to overcome, or at least mitigate, the aforesaid difficulties.

According to the present invention, there is provided a hose section suitable for use in the transport of a fluid between points separated by a liquid medium. The hose section comprises an inner hose for transport of fluid; an outer hose arranged substantially concentrically about the inner hose to leave an air space therebetween; air passages formed at longitudinally opposite ends of the section for communicating the air spaces of adjacent sections through auxiliary hoses, the air space being such that when the space is filled with air the buoyancy acting on the hose section can float the hose section on the liquid medium, said hose section being submersible in the liquid medium when the air space is reduced by evacuation; and a resistive core wall structure secured to the outer peripheral surface of the inner hose with a spacing from the outer hose, the shape of the core wall structure being such that friction-free communication between the opposite ends of the hose section is ensured through the air space even when the outer hose is forced to come in contact with radial outer peripheral surfaces of the core wall structure, the hose section being submersible when the material part of the outer hose is forced to contact the core wall structure. The invention hose setting thereby comprises an inner hose for transport of fluid and an outer hose arranged substantially concentrically about the inner hose to leave an air space therebetween whereby the hose section can float on the liquid medium, which hose section is submersible in the liquid medium when the air space is at least partly evacuated, the resistive core structure acting to uniformly distribute air over the whole length of the air space of the hose section and in the longitudinal direction of the hose section.

By use of a resistive core structure according to the invention, local closure of the air space is prevented when the air is being evacuated therefrom, thus providing a sufficient air path for evacuation purposes, so that the hose line may be submerged smoothly.

The resistive core structure can be helical, or can consist of ribs extending over substantially the entire length of the hose section. The resistive core structure can also consist of a plurality of annular ribs spaced apart and disposed over substantially the entire length of the hose section, or the core structure can be straight walls parallel with the longitudinal central axis of the hose section. The resistive core structure, especially when helical or consisting of annular ribs, advantageously contains one or more recesses in the surface thereof.

Although the resistive core structure can be provided in the air space between the inner hose and the outer hose as a separate member, it is advantageously affixed to or integral with the inner hose.

In practice, it is expected that a plurality of hose sections will be joined together end-to-end to form a hose line for transport of a fluid. For the purposes of supply of air to or evacuation of air from the air space, it will only be necessary to attach the ends of the hose line to an air supply or evacuation means. The use of a separate auxiliary air pipe running along the length of the hose line can be dispensed with.

For a better understanding of the invention, and to show how it can be carried into effect, reference will now be made, by way of illustration only, to the accompanying drawings, wherein:

FIG. 3 shows a side view of a submersible hose according to the present invention, in which the outer hose is shown partly removed;

FIG. 4 is a cross-sectional view of the hose shown in FIG. 3 along the line B—B.

Figure 1:
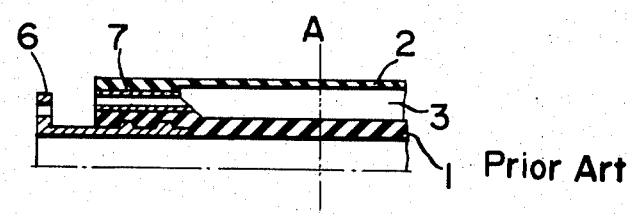
FIG. 1 shows a longitudinal cross-section through a conventional submersible hose having a double layer construction.
Figure 2:
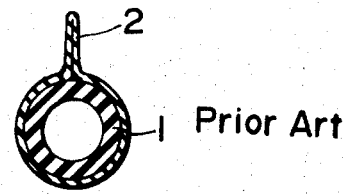
FIG. 2 shows a cross-sectional view taken along the line A—A of FIG. 1 showing the form of the hose when air inside is evacuated to make it submerge.

Referring to the drawing, FIGS. 1 and 2 show the manner in which a conventional double layer submersible hose section is constructed. The submersible hose section comprises an inner hose 1, an outer hose 2, and an air chamber 3 formed between the inner hose 1 and the outer hose 2. At each end of the submersible hose section, a flange 6 is provided to interconnect hose sections to form a hose line. An air duct 7 for ingress and egress of air is provided which can be connected to an auxiliary air pipe (not shown) of small diameter. Air can be supplied to and evacuated from the air chamber 3 through the duct 7 to control floating or submersion of the hose line.

If one wishes to submerge the hose line, the air in the air chamber 3 is evacuated through the auxiliary air pipe to deform the outer hose. However, complete local closure of the outer hose may take place prior to completion of the submersion of the hose when it assumes the cross-section shown in FIG. 2 in a local region only, so that the evacuating air path is completely closed by complete contacting of the outer hose 2 to the inner hose 1. Such local closing of the outer hose 2 prevents complete evacuation of the air in the air chamber 3 so that complete submersion cannot be effected.

In the case of conventional hoses of the type shown in FIGS. 1 and 2, a submersible hose line is divided into a plurality of hose sections as mentioned above and an auxiliary air pipe having a small diameter is arranged along the whole length of a hose line, being connected to each of the air ducts 7 so that evacuation of each of the hose sections takes place separately. Thus, the conventional hose lines have the additional disadvantage of complicated construction which requires a long assembly. In addition, the presence of the auxiliary air pipe reduces the streamlined appearance of the hose line and increases its resistance to water turbulence.

One embodiment of the submersible hose according to the present invention is shown in FIGS. 3 and 4 of the drawing, wherein a helical resistive core structure 14 is provided between an inner hose 11 and an outer hose 12. This helical resistive core structure 14 can be provided with recesses 15 at suitable positions on its outer periphery to aid the flow of air when the air in the space 13 between the hoses 11 and 12 is being evacuated.

By constructing the hose sections in accordance with the present invention, as shown in FIGS. 3 and 4, an air passage can be maintained over the whole length of the submersible hose line, particularly when the air chamber 13 is being exhausted to submerge the hose line. This air path is maintained irrespective of any deformation of the outer hose occurring and facilitates the submersion of the hose line in accordance with the amount of air which it is desired to withdraw from the outer hose 12.

A helical core structure is particularly suitable for maintaining an air passage over the length of the outer hose 12 at the time of deformation thereof by evacuation of air from the space 13 along the whole length of the hose line. The core structure 14 prevents local closure of the air passage between the outer surface of the inner hose 11 and inner surface of the outer hose 12. By using the hose structure of the present invention, a very smooth evacuation of the air is possible and complete submersion of the hose line can be readily effected.

By use of the construction according to the present invention, it is no longer necessary to provide an auxiliary air pipe along the whole length of a hose line in the manner of conventional hose lines, with a connection between an air duct of each hose section and the auxiliary hose to allow introduction of air to or evacuation of air from the inside space. Assembly of a hose line from hose sections according to the invention becomes much easier, and operation of the hose line is not affected by problems of operation of the auxiliary air pipe. Furthermore, a hose line of streamlined appearance is obtained which is less susceptible to damage in turbulent water.

Figure 5:
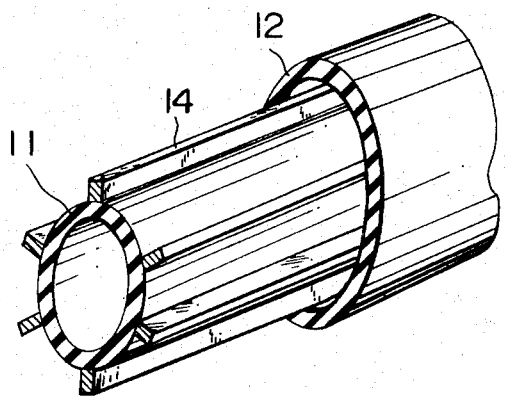
FIGS. 5 and 6 are schematic perspective views, showing two different embodiments of the present invention, respectively.
Figure 6:
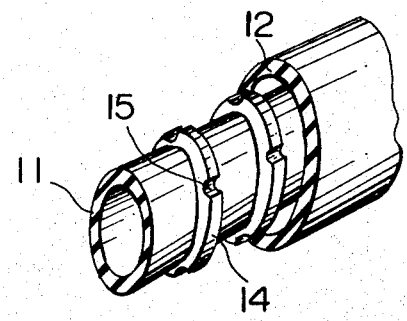

The nature of the materials used in the construction of the inner and outer hoses and the resistive core structure is not important, provided that a suitably flexible structure is obtained. For instance, the shape of the resistive core structure 14 can be straight linear, as shown in FIG. 5, or the core structure 14 can be annular with notches 15, as shown in FIG. 6.

What is claimed is:

1. A hose system comprising a hose section of a hose line comprising a plurality of adjacent hose sections, which is selectively submersible in a liquid medium and suitable for use in the transport of a fluid between points separated by a liquid medium, comprising an inner hose for transport of fluid, a deformable outer hose arranged about the inner hose to leave an air space therebetween, air passages formed at longitudinally opposite ends of the section for communicating the air spaces of the adjacent sections; auxiliary hoses connected to the air passages, an air supply and evacuation means connected to the ends of the hose line, the air space being such that when the space is filled with air the buoyancy acting on the hose section can float the hose section on the liquid medium, said hose section being submersible in the liquid medium when the air space is reduced by evacuation, and a resistive core wall structure secured to the outer peripheral surface of the inner hose with a spacing from the outer hose, the shape of the core wall structure being such that friction-free communication between the opposite ends of the hose section is ensured through the air space even when the deformable outer hose is forced to come in contact with radial outer peripheral surfaces of the core wall structure, the hose section being submersible when the material part of the outer hose is forced to contact the core wall structure.

2. A hose section according to claim 1, wherein the resistive core structure is a spiral-wall formed on the outer peripheral surface of the inner tube.

3. A hose section according to claim 1, wherein the resistive core structure includes recesses formed on the outer peripheral surface thereof.

4. A hose section according to claim 1, wherein the resistive core structure consists of straight walls parallel with the longitudinal central axis of the hose section.

5 A hose section according to claim 1, wherein the resistive core structure consists of a plurality of rings each having a recess formed on the outer peripheral surface thereof.

* * * * *